Nov. 15, 1960     G. I. CHIODO     2,960,138
TIRES
Filed Feb. 19, 1957     2 Sheets-Sheet 1
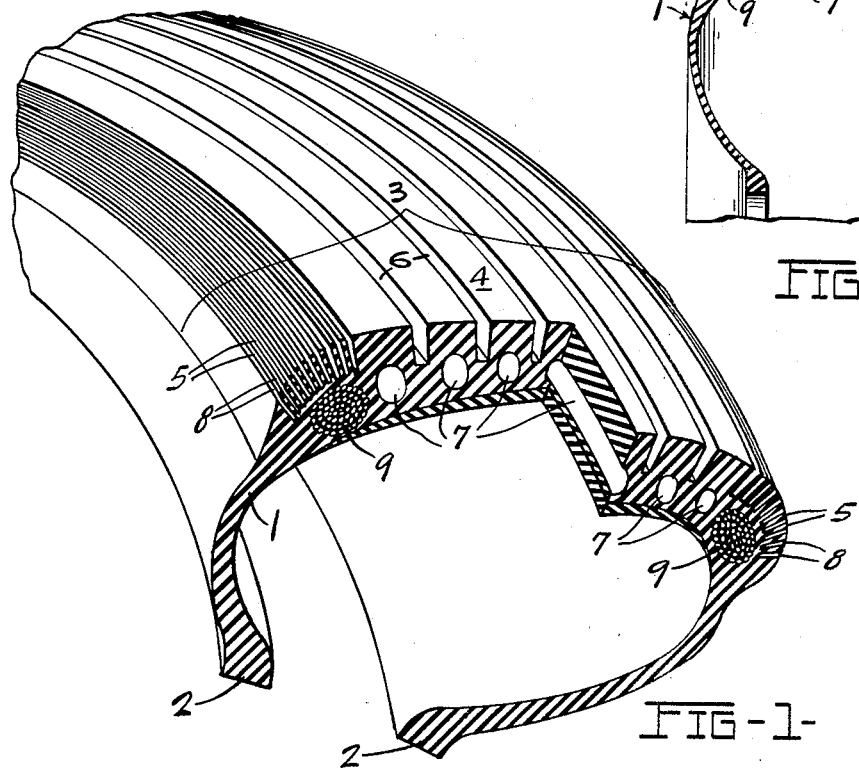
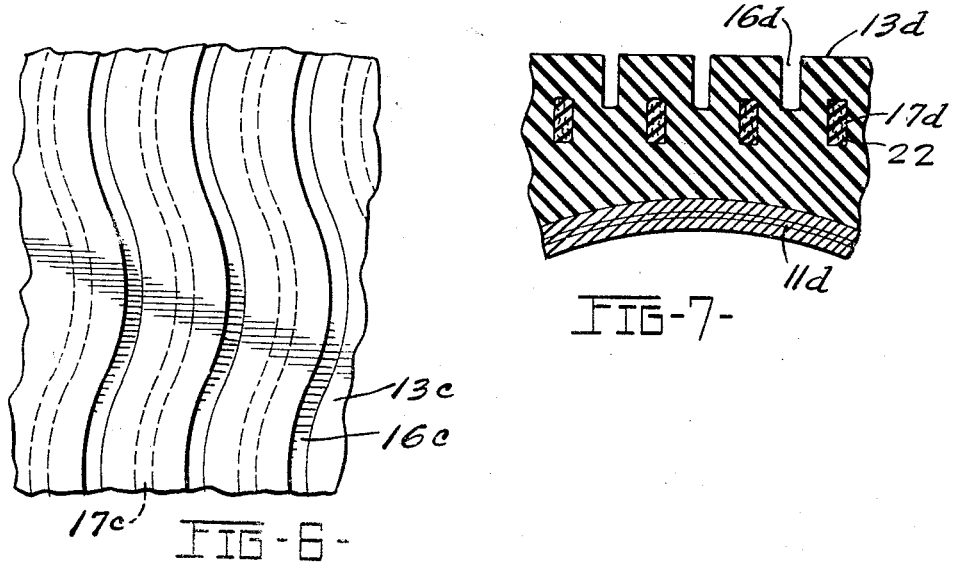

Nov. 15, 1960  G. I. CHIODO  2,960,138
TIRES
Filed Feb. 19, 1957  2 Sheets-Sheet 2
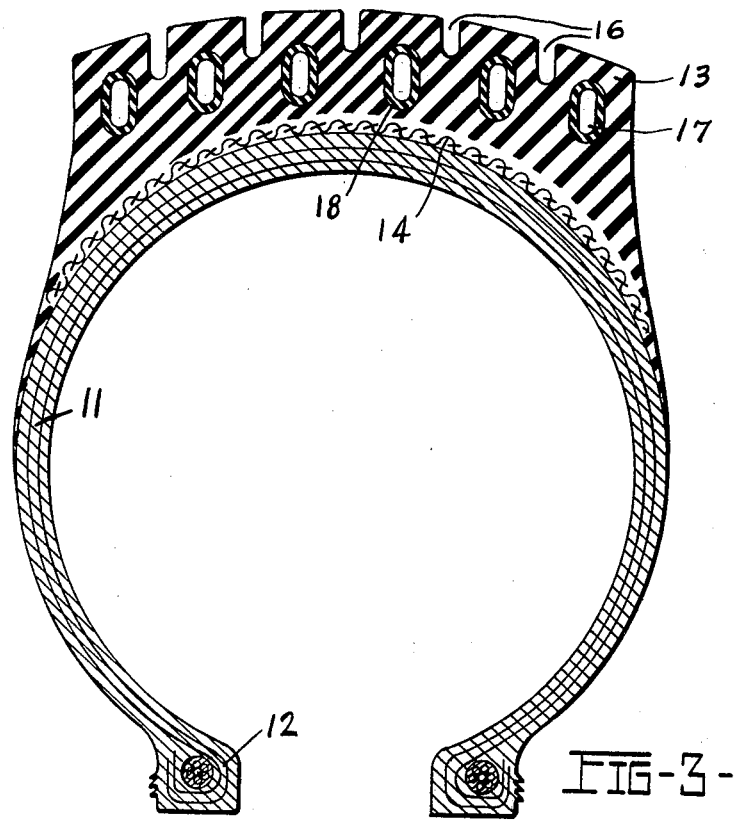
FIG-3-
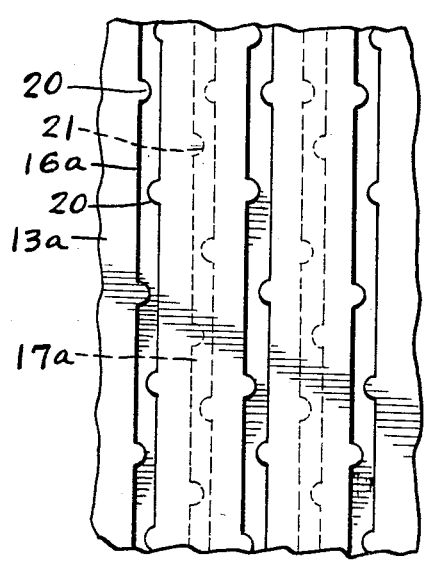
FIG-4-
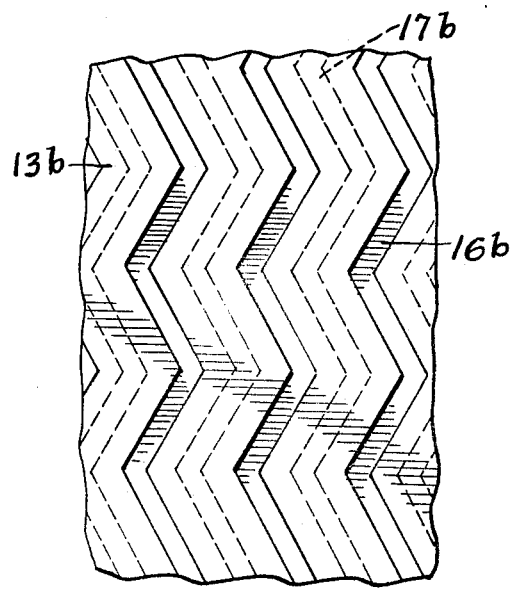
FIG-5-

# United States Patent Office 2,960,138
Patented Nov. 15, 1960

---

2,960,138

TIRES

Giuseppe I. Chiodo, Palermo, Italy, assignor of one-half to Robert E. Burns, New York, N.Y.

Filed Feb. 19, 1957, Ser. No. 641,138

4 Claims. (Cl. 152—209)

The present invention relates to rubber tires for vehicles. The term "vehicle" is herein used in a broad sense to include cars, trucks, buses, planes, tractors, etc. The tires may be formed either of natural rubber of synthetic rubber or a combination of two or more different kinds of rubber. The invention is particularly applicable to pneumatic tires which may be tubeless or may have inner tubes.

The application is a continuation-in-part of my co-pending application, Serial No. 350,855, filed April 24, 1953 now Patent No. 2,787,473.

It is an object of the present invention to provide an improved tire which is safer and longer wearing. The tread portion of present tires becomes smooth when the tire is worn and loses most of its holding power, particularly in wet weather. In accordance with the invention the tire is provided with a relatively thick tread portion having grooves in an outer layer and circumferentially extending cavities in an inner layer. The outer portions of the cavities extend outwardly beyond the roots of the grooves. The grooved outer portion of the tread provides a road gripping surface when the tire is new. The underlying cavities provide a softer tread so that a larger area of the tire comes into contact with the road and the pressure of the tire on the road is more uniformly distributed. The resulting lower unit pressure reduces the rate of wear. Moreover, the internal cavities provide a cooling effect so that the operating temperature of the tire is reduced.

When the tire becomes worn to the point where the bottoms of the groove are reached, the rubber outside the aforementioned cavities is worn through so that the cavities become exposed as groves and define new road gripping surfaces. Hence instead of becoming smooth, the tire has a second life. Although the tread portion of the tire in accordance with the invention is preferably thicker than that of present tires, the cavities in the inner portion of the tread reduce the amount of rubber required and thereby reduce both cost and weight.

A further feature of a preferred embodiment of the invention is that the tires have improved road gripping characteristics when the wheels are tilted in going around a curve as described in the above mentioned co-pending application.

Other objects and advantages of the invention will become apparent from the following description and claims in conjunction with the accompanying drawings which illustrate by way of example preferred embodiments of the invention and in which Fig. 1 is a fragmentary perspective and cross sectional view showing a pneumatic tire in accordance with the invention.

Fig. 2 is a cross section of the tire on a smaller scale.

Fig. 3 is a cross section of another embodiment.

Figs. 4, 5 and 6 are fragmentary views looking down at the tread of the tire and showing three different modifications of the invention.

Fig. 7 is a fragmentary cross section of the tread portion of a tire illustrating a further modification.

In Figs. 1 and 2 there is shown a pneumatic tire casing having a carcass 1 with bead portions 2 and a tread portion 3. The carcass is of customary or desired construction formed for example of layers of cord or fabric bonded together and covered with rubber. The bead portions 2 may be reinforced with cables or cords as desired. The tread portion 3 is formed of rubber and comprises a central portion 4 and side portions 5. The central portion of the tread is formed with a plurality of spaced circumferentially extending grooves 6 which increase the road gripping properties of the tire. In an inner portion of the tread and disposed between the grooves 6, there are provided a plurality of circumferentially extending cavities 7 which are disposed so that the outer portions of the cavities are approximately level with the roots of the grooves 6. Side portions 5 of the tread disposed at an angle of approximately 15 degrees from the central plane of the tire are formed with deep closely spaced slits or grooves 8 which provide a fine comb tread surface. The side tread portions of the tire are shown reinforced by cord structures 9 underlying the comb tread defined by the closely spaced grooves 8.

The tire shown in Figs. 1 and 2 is particularly applicable for use on vehicles having provision for tilting the wheels when going around curves as described in the above co-pending application. When the vehicle is going straight ahead with the wheels vertical, the wear resisting central portion 3 of the tread takes most of the load. When the wheels are tilted in going around a curve the comb treads 5 are brought into full engagement with the roadway and being fine and deeply cut will crush under the weight of the vehicle, forcing the fine edges of the tread into depressions and crevices of the roadway and thereby providing a strong skid resisting grip. The reinforcing cord structures 9 prevent excessive deformation of the tire under the off balanced weight of the vehicle when going around a curve. The tire tread is oval in cross section. The oval shape of the tread permits the wheels to tilt to any desired angle while the cavities 7 cushion the road engaging portion of the tread and permit the tread to adapt itself to the roadway regardless of the angle of tilt so as to provide adequate contact areas. In addition, the cavities 7 relieve the oval tread from undue wear caused by overinflation of the tire. Excess air pressure in the tire will give the internal structure of the tire casing a rigid toroidal form but will not affect the top tread since the cavities 7 permit the tread to adapt itself to the road surface regardless of whether the wheels are vertical or tilted and thereby distribute the weight over a larger area. The cavities 7 may be hollow or may, if desired, be filled with foam rubber or any other elastic material capable of recovering quickly from compression. If the cavities are hollow they have the further advantage of helping to cool the tire by air circulation in the cavity. As the wheel rotates, the progressive flattening of the portion of the tire tread in contact with the road produces a pumping action to cause the air to circulate inside the passages 7 and thereby assist in transferring heat to the outer portion of the tire tread where it is dissipated.

The pneumatic tire shown in Fig. 3 comprises a carcass 11 with bead portions 12 and a tread portion 13. Between the carcass and the tread portion there is provided a layer of metal or other fabric 14 which protects the carcass from blow-outs and punctures. In the outer portion of the tread 13 there are provided a plurality of circumferentially extending grooves 16 which define a road gripping tread surface. In the inner portion of the tread there are formed a plurality of circumferentially extending cavities 17 which are located approximately midway between successive grooves 16. The cavities 17 are preferably of about the same cross sectional size and shape as the grooves 16. The radially outer portions of the cavities 17 are disposed at approximately the same level as the bottoms of the grooves 16 so that a line connecting the bottoms of the grooves would intersect the intervening cavities. In the construction shown in Fig. 3 the cavities 17 are defined by tubes 18 which are molded into the rubber stock of the tread portion 13 and united therewith for example by vulcanizing. The tubes 18 defining the cavities 17 may be of the same composition as the body of the tread 13 but in some instances it may be desirable to use a different stock for the tubes 18 for example to obtain a harder, softer or tougher rubber.

When the tire is new, the grooves 16 in the tread provide an effective road gripping surface. The underlying cavities 17 cushion the tread so as to provide for weight distribution even if the tire is over-inflated. The cushioning action of the cavities 17 also assists in protecting the carcass of the tire from shocks and bruises. When the tire wears down to the bottoms of grooves 16, the cavities 17 are exposed and become grooves which provide a road gripping surface comparable to that of a new tire. Hence, instead of becoming smooth and unsafe, the tires have a second life. By suitable compounding of the rubber forming the tubes 18 which define the cavities 17, it is possible to provide wear resisting edge portions for the grooves formed by cavities 17 thereby further increasing the effectiveness of the grooves.

The grooves 16 and cavities 17 may be straight—except for the curvature of the tire—and of uniform width. Alternatively the grooves and cavities are susceptible of having different configurations some of which are illustrated by way of example in Figs. 4, 5 and 6 which are fragmentary views looking down at the tread of the tire. In Fig. 4 the tread portion 13a of the tire is provided with grooves 16a provided with circumferentially spaced radially extending ribs 20 which project into and thus attenuate the grooves. It will be seen that the ribs 20 are formed alternately on opposite sides of the groove 16a. The inner portion of the tread is provided with circumferentially extending cavities 17a which are likewise provided with inwardly projecting ribs 21 attenuating the cavities at circumferentially spaced points. The attenuations of the cavities 17 are preferably staggered with respect to those of the grooves 16.

In Fig. 5 the tread portion 13b is shown provided with grooves 16b of zig-zag configuration and corresponding zig-zag circumferentially extending cavities 17b. In Fig. 6 the tread portion 13c is shown provided with sinuous or undulating grooves 16c and corresponding undulating cavities 17c. It will be understood that in Figs. 4, 5 and 6 the grooves are located in the outer portion of the tread and the cavities are located in the inner portion in the relation illustrated in Fig. 3.

The circumferentially extending cavities in the inner portion of the tread may contain only air either at atmospheric pressure or at a higher pressure. Alternatively the cavities may contain sponge or foam rubber or similar material. In Fig. 7 there is shown by way of example a tire having a carcass 11d and a tread portion 13d provided with circumferentially extending grooves 16d in its outer portion and circumferentially extending cavities 17d in its inner portion. The cavities 17d are filled with foam rubber 22. Sawdust or other friction increasing materials may, if desired, be incorporated in the foam rubber filling the cavities. When the tire is worn down so that the cavities 17d and foam rubber strips 22 are exposed the friction material incorporated in the foam rubber becomes progressively available to increase the holding power of the tire.

The tire in accordance with the present invention is easily manufactured. Cavities of the kind shown in Figs. 1 and 2 are readily formed by extruding the rubber stock through a suitable die or by building the tread up from strips of rubber. With the construction shown in Fig. 3, the cavities 17 are formed by imbedding previously extruded tubes 18 in the tire tread stock. Likewise in the construction shown in Fig. 7 the cavities 17d are provided by previously formed foam rubber strips 22 imbedded in the rubber composition of the tread.

It will thus be seen that the present invention provides an important advance in tire construction. Tires in accordance with the present invention have a life approximately twice as great as that of tires presently available and thereby provide greater economy. The useful life of tires in accordance with the invention approximates that of a car so that tires do not need to be replaced.

The various features of the several embodiments are mutually interchangeable insofar as they are compatible.

It will be understood that the invention is in no way limited to the preferred embodiments shown by way of example in the drawings and particularly described.

What I claim and desire to secure by letters patent is:

1. A tire comprising a carcass and a tread, said tread having in an outer layer a plurality of circumferentially extending grooves providing a road-gripping surface and a plurality of tubes embedded in said tread and extending circumferentially of said tire and being disposed between said grooves, said tubes having flexible elastic side walls formed of a different composition than said tread.

2. A tire comprising a carcass and a tread, said tread having in an outer layer a plurality of spaced circumferentially extending grooves defining lands between said grooves and having in an inner layer a plurality of tubes embedded in said tread and extending circumferentially of said tire and disposed beneath said lands between said grooves, said tubes having flexible elastic walls and having circumferentially spaced indentations in said walls locally restricting the cross section of said tubes.

3. A tire comprising a carcass and a tread, said tread having in a central and outer portion a plurality of spaced circumferentially extending grooves defining lands between said grooves and having in outer side portions disposed at each side of said central portion a plurality of deep narrow radially spaced slits each said slit extending circumferentially around the tire and each said slit being radially spaced around the outermost edge of the outer lands on each side of said tire, the spacing distance of said slits being much less than the spacing of said grooves, said tread having in an inner portion a plurality of circumferentially extending tubular passageways disposed between said grooves and lying directly beneath said lands.

4. A tire according to claim 3, comprising a cable embedded in said tread inward of each said slitted side portions and extending circumferentially of the tire for supporting and cooling said circumferentially slit tire lands and said tire.

References Cited in the file of this patent

UNITED STATES PATENTS

| | | |
|---|---|---|
| 1,057,164 | Messenger | Mar. 25, 1913 |
| 1,608,077 | Wieser | Nov. 23, 1926 |
| 2,260,193 | Overman | Oct. 21, 1941 |
| 2,459,762 | Hargraves | Jan. 18, 1949 |
| 2,708,957 | Constantakis et al. | May 24, 1955 |

FOREIGN PATENTS

| | | |
|---|---|---|
| 533,651 | Germany | Sept. 17, 1931 |